(12) United States Patent
Sung

(10) Patent No.: US 6,914,418 B2
(45) Date of Patent: Jul. 5, 2005

(54) MULTI-MODE RENEWABLE POWER CONVERTER SYSTEM

(75) Inventor: Chang-Che Sung, Junghe (TW)

(73) Assignee: Phoenixtec Power Co., Ltd., Taipei (TW)

( * ) Notice: Subject to any disclaimer, the term of this patent is extended or adjusted under 35 U.S.C. 154(b) by 76 days.

(21) Appl. No.: 10/419,343

(22) Filed: Apr. 21, 2003

(65) Prior Publication Data

US 2004/0207366 A1 Oct. 21, 2004

(51) Int. Cl.[7] .............................................. H01M 10/46
(52) U.S. Cl. ..................................................... 320/140
(58) Field of Search ................................ 320/101, 127, 320/128, 140; 136/291, 292, 293

(56) References Cited

U.S. PATENT DOCUMENTS 6,262,558 B1 * 7/2001 Weinberg .................... 320/101
6,433,522 B1 * 8/2002 Siri ............................. 323/272
6,590,793 B1 * 7/2003 Nagao et al. .................. 363/95

* cited by examiner

Primary Examiner—Edward H. Tso
(74) Attorney, Agent, or Firm—William E. Pelton, Esq.

(57) ABSTRACT

A multi-mode renewable power converter system is disclosed. The system includes a control unit, a boost converter, an inverter and optional bi-directional charger, wherein the boost converter converts DC output of a solar cell or a renewable source to high DC bus voltage, and the inverter converts this DC bus voltage to an AC output. This power converter can be used to support standalone load or grid-connected system with a dynamic maximum power point tracking (MPPT) circuit. The MPPT circuit detects the current and voltage from the solar cell and indicates to the inverter to provide power to the load connected. When the optional bi-directional charger is installed, the MPPT signal is also fed to this charger to make the power efficiency maximized for the system.

18 Claims, 5 Drawing Sheets

US 6,914,418 B2

MULTI-MODE RENEWABLE POWER CONVERTER SYSTEM

BACKGROUND OF THE INVENTION

1. Field of the Invention

The present invention relates to a multi-mode renewable power converter system, in particular to a power converter that is able to operate with different modes to suit various power and load requirements. In addition, it can also improve conversion efficiency in some existing solar power conversion systems.

2. Description of Related Arts

The electrical power demand from industrial and household users continue to increase, amidst growing concerns of the pollution problems and the depletion of coal and oil in our planet. The technology for utilizing renewable power from the natural resources has received increasing attention by scientists around the world. Among all the alternatives, solar power appears to be most promising, because it is most abundant in our environment and the cleanest among all. People living in remote areas and satellite towns have been using solar cells to supplement their regular power supply. Many countries have encouraged their people to install the solar power system in their homes to reduce the burden on existing power utilities. Environmental issues such as nuclear waste and carbon dioxide emission from the thermal power plant are still unresolved up to the present. With so many benefits for using renewable energy, the power output from the renewable energy is directly connected to the electricity distribution grid in many countries.

However, conversion of solar energy in general is still very expensive, and the efficiency of inverters for converting DC output from solar cells to sinusoidal AC power is another challenge for producers of power generators. FIG. 7 shows the architecture of a conventional solar power generator, solar power collected by a solar panel is converted to AC power by an inverter. The system suited for a standalone load includes a charger (70), a boost converter (71), an inverter (72), and a storage battery (73). The charger (70) is connected to the output of the solar panel (80) for charging the battery (73) with the solar energy; the boost converter (71) is connected to the output of the charger (70) and the storage battery (73) for boosting battery voltage to higher voltage; the inverter (72) is connected to the boost converter (71) for converting the high DC power to AC output and then delivering the power to the load (81); the storage battery (73) is connected to the output of the charger (70).

In actual operation, the above mentioned solar power system uses a solar panel (80) to collect solar power and generates DC output to the charger (70) which then charges the storage battery (73), which is typically a 48V storage battery for supplying the power to a standalone load. Generally, for certain heavy duty applications, the voltage of the storage battery is not high enough, it needs additional conversion stages to boost the output voltage, but in that case, the total power conversion efficiency from renewable power source to AC output will not be very high (approx. 90%).

In some applications, to make the optimal usage of the power from photovoltaic (PV) array, a maximum power point tracking (MPPT) circuit is employed for tracking the optimum power output of the PV array. As shown in FIG. 6, this MPPT circuit function is mainly performed in the charger section (70) only. Although this can make the maximum use of PV array, the conversion efficiency cannot be improved.

In FIG. 8, the block diagram shows the architecture of another solar power system for high power grid-connected systems (81a). The basic structure of the system is similar to the previously described case, only without the storage battery and the charger (not shown). The power from the solar panel (80) is boosted to higher level directly and converted into AC output to the grid or utility (81a), wherein the solar panel (80) can be implemented by high voltage photovoltaic arrays (PV array) (>300V). In addition, the voltage level from PV array is generally higher, therefore the total conversion efficiency of the system can be raised to 95%. The shortcoming of such system is that it lacks a back-up power system. Even if a battery can be connected to the system output, the voltage is too high for ordinary user applications. An additional charger must be used resulting in increased circuit complexity and inconvenience to ordinary power users. It is apparent that in a more ideal situation the system needs to have an inverter that can match the different power specifications for standalone load or grid-connected system.

SUMMARY OF THE INVENTION

The main object of the present invention is to provide a multi-mode renewable power converter system that is able to convert DC power from PV array to AC to suit the different power requirements for both standalone load and grid-connected systems.

The architecture of the renewable power converter system in accordance with the present invention includes a control unit, a boost converter, an inverter and an optional bi-directional charger.

The control unit has incorporated a MPPT circuit used for continuously tracking the power output from the system and provides necessary control so as to make the optimal usage of the renewable power source. The MPPT circuit detects the current and/or voltage from the PV array and orders the inverter to provide the necessary power to supply the standalone load and grid-connected system.

The boost converter is to convert the DC output to high DC bus voltage.

The inverter is to convert the DC bus voltage to AC voltage output for the standalone load or AC current for grid-connected applications. If an optional bi-directional charger is installed, it can be operated in bi-directionally for charging the storage battery or delivering high voltage output to the DC bus. The use of an optional bi-directional charger depends on the type of load connected and whether the inverter is installed with a storage battery.

The above mentioned renewable power converter first analyses the power requirement for the connected loads, and then monitors the distribution of power output from the renewable power source to the bi-directional charger and the inverter through the DC bus in accordance with an appropriate ratio.

If the inverter is installed with a storage battery, the control unit monitors the power distribution to the bi-directional charger and the inverter. The control unit continuously checks the power output from the renewable source, and if it is insufficient, it orders the bi-directional charger to make connection with the storage battery to provide the necessary power to the inverter, which then in turn converts it to AC voltage for the load. If the inverter is not installed with a storage battery, the inverter converts all the output from the DC bus to AC output for the load.

DETAILED DESCRIPTION OF THE PREFERRED EMBODIMENT

The present invention provides a multi-mode renewable power converter system, which is able to operate in different modes to suit various power and load requirements, maintaining high power conversion efficiency and ease of operation.

Figure 1:
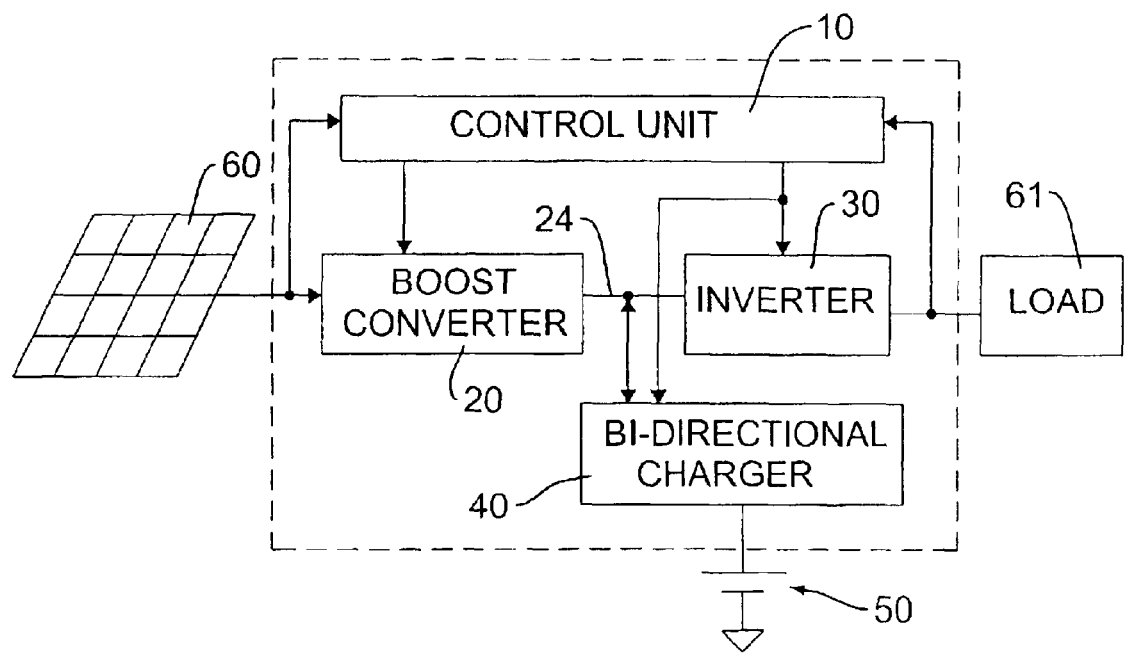
FIG. 1 is a block diagram of the system architecture of the present invention.

As shown in FIG. 1, the architecture of the renewable power converter system includes a control unit (10), a boost converter (20), an inverter (30) and an optional bi-directional charger (40). The bi-directional charger (40) is connected to a storage battery (50), and the boost converter (20) is connected to the DC output of a renewable power source (60).

The control unit (10) has incorporated an MPPT function for tracking and controlling the power output so as to enable the optimal usage of the power from the renewable power source (60) to the inverter (30) and then on to the power user. The control unit (10) can be established by firmware in a microprocessor or by a hardware implementation, wherein the function of the MPPT can also be implemented by a microprocessor controller.

Figure 2:
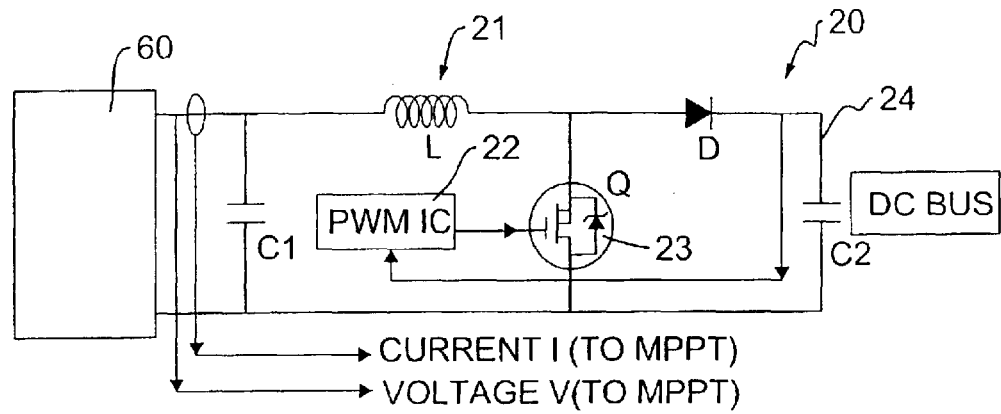
FIG. 2 is a schematic diagram of the boost converter.
Figure 3:
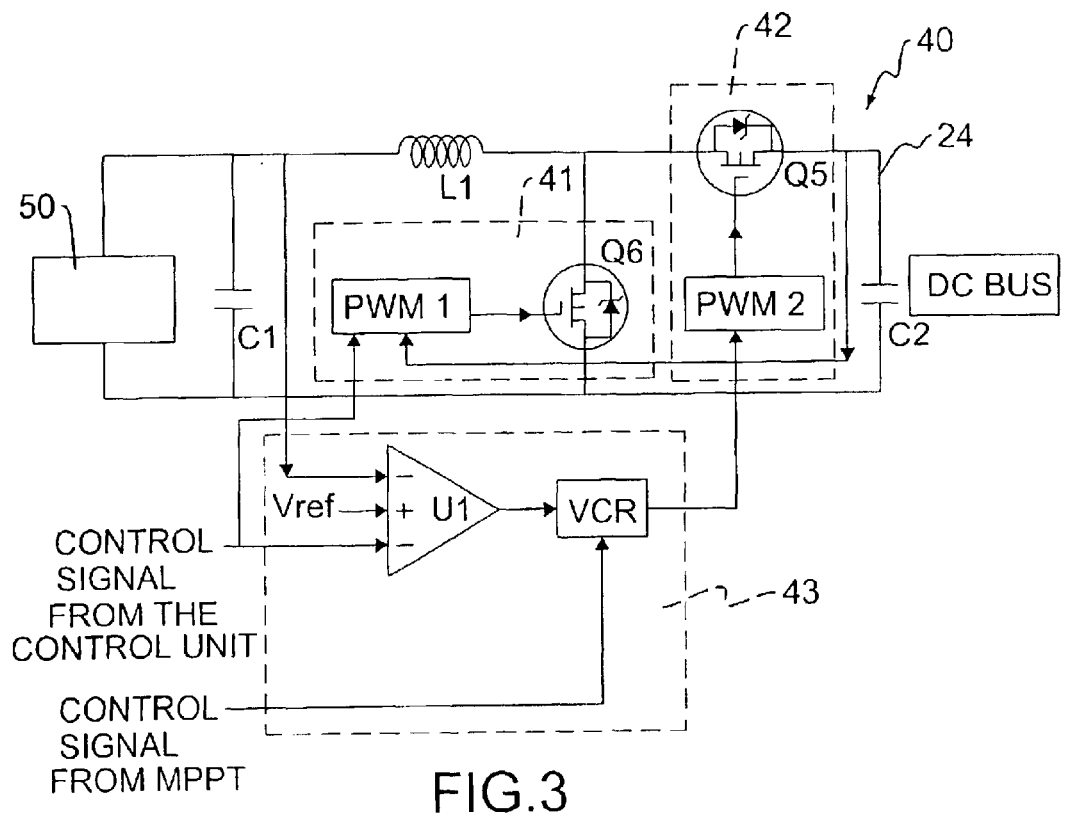
FIG. 3 is a schematic diagram of the bi-directional charger.

The current embodiment demonstrates an example of the operational model, as shown in FIGS. 2 and 3. The boost converter (20) is connected to the output of the PV array or the renewable power source (60) for converting DC to high voltage and then delivering the high voltage DC on to a DC bus (24). In FIG. 2, the boost converter (20) further includes a PWM controller (22), a switch (23) and a choke (21) connected to the DC bus (24). The switch (23) can be a MOSFET device. When the switch (23) is turned on, the energy will be stored in the choke (21), and when the switch (23) is turned off, the energy will be transferred to the capacitor C2 through the diode D. The PWM controller (22) controls the duty cycle of the switch (23), so that the voltage on the DC bus (24) will be regulated. The current and voltage from the PV array or the renewable power source (60) are continuously monitored and sent to the MPPT circuit for calculation of the maximum power point.

Figure 4:
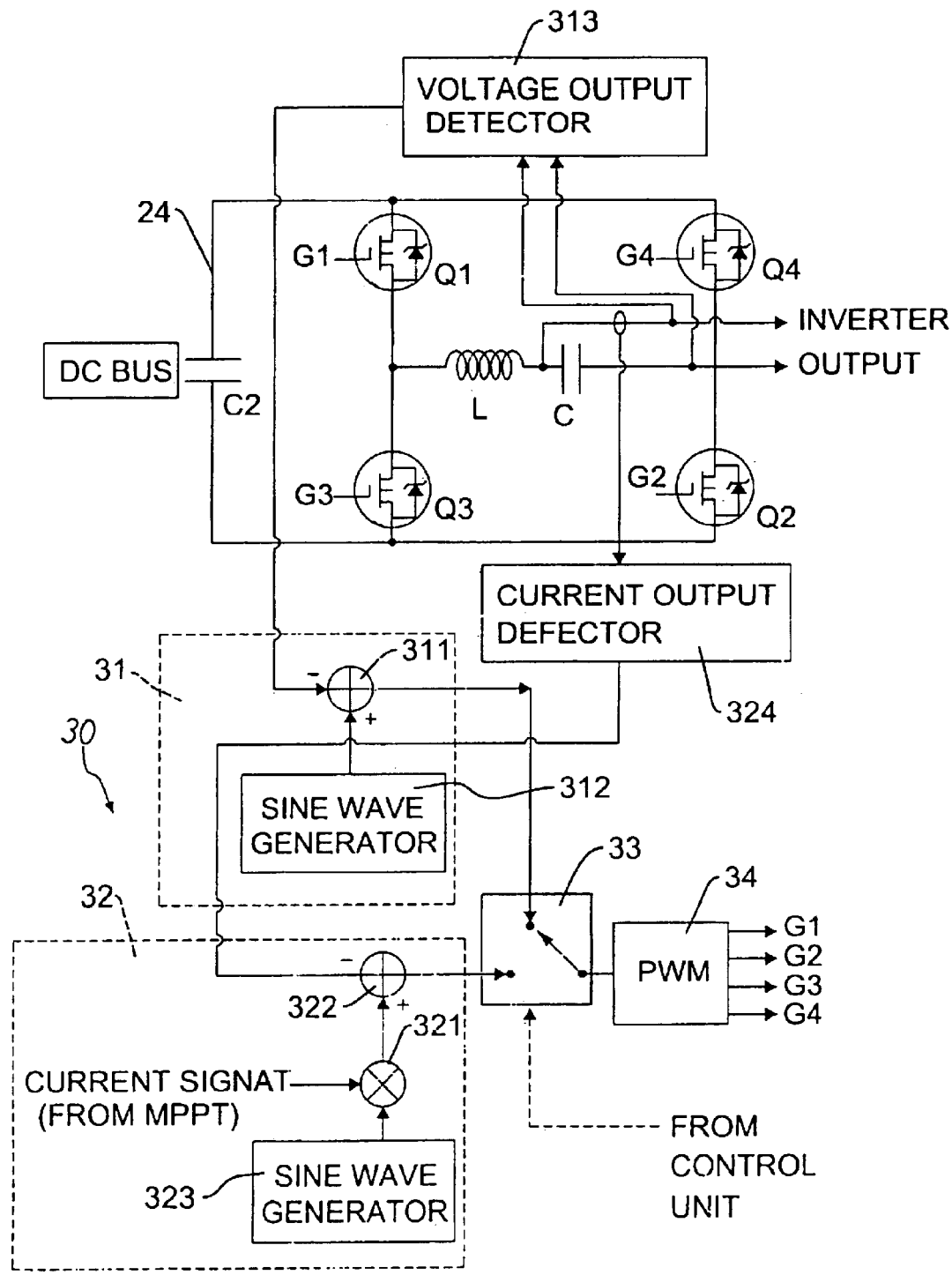
FIG. 4 is a schematic diagram of the inverter.

Basically, the inverter (30) can be operated in two modes, a standalone mode and a grid-connected mode, under the control of the MPPT circuit. As shown in FIG. 4, the inverter (30) connected to the DC bus (24) and the control unit (10) (not shown) is able to send a control signal by the MPPT circuit to control the inverter (30) to provide the power to the load. The inverter (30) comprises two pairs of alternating switches (Q1, Q2), (Q3, Q4) and a filter (L, C) to form a full bridge conversion unit. The inverter (30) further includes a voltage feedback loop (31) and a current feedback loop (32), where the output from the inverter (30) is fed back to the voltage loop (31) and the current loop (32). The input terminals of the voltage feedback loop (31) and the current feedback loop (32) are connected to a filter (L,C) respectively through a voltage detector (313) and a current detector (324). The output terminals of the two loops (31)(32) are fed to a pulse width modulation (PWM) controller (34) through a mode control switch (33) which controls the on-off timing of two pairs of alternating switches (Q1, Q2), (Q3, Q4). AC voltage is output through the filter (L, C).

The input of the current loop (32) is further connected to the current signal output of the MPPT circuit in the control unit (10). The voltage loop (31) is connected to the output terminal of the filter (L,C) feeding back the AC output voltage to the PWM controller (34).

The voltage feedback loop (31) is formed by a subtractor (311) and a reference sine wave generator (312), wherein the subtractor (311) is connected to the output of the filter (L,C), and the output from the sine wave generator (312). These two inputs are subtracted to produce a voltage difference. The PWM controller (34) is fed by the voltage difference from inverter output voltage and reference sine wave through the mode control switch (33) for monitoring the voltage output from the inverter (30) in the standalone mode.

The current loop (32) is formed by a multiplier (321), a subtractor (322) and a reference sine wave generator (323). The input of the multiplier (321) is simultaneously connected to the output current control terminal of the MPPT circuit and the output of the sine wave generator (323). The output of the multiplier (321) is connected to the input of the subtractor (322), and the output current signal of the inverter (30) is also connected to the subtractor (322). These two inputs are subtracted to generate a current difference value. The PWM controller (34) is fed by the current difference from multiplication of current signal from MPPT and current reference sine wave through the mode controller (33) for monitoring the current output from the inverter (30) in the grid-connected mode.

The above mode control switch (33) is connected to the output of the voltage feedback loop (31) and current feedback loop (32) for controlling the switching action by the control unit (10). The input of the PWM controller (34) is connected to the voltage feedback loop (31) or the feedback loop (32) through the mode control switch (33). The four output terminals of the PWM controller (34) are respectively connected to the control terminals (G1, G2, G3 and G4) of four switches (Q1, Q2, Q3 and Q4).

When the control unit (10) senses that the currently connected power user is a standalone load, then a signal is sent to the mode control switch (33) to cause the system to switch over to the standalone mode. The control unit (10) orders the mode controller (33) to switch to connect the PWM controller (34) and the voltage feedback loop (31), such that the inverter (30) can deliver power output to match the AC requirement of the standalone load.

When the control unit (10) senses that the currently connected power user is a grid-connected system, then a signal is sent to the mode control switch (33) to cause the system to switch over to the grid-connected mode. The control unit (10) orders the mode controller (33) to switch to connect the PWM controller (34) to the current feedback loop (32), such that the amplitude of current output from the inverter (30) can be controlled to make the optimal usage of solar cells. The MPPT current signal is shared with the optional bi-directional charger (40), so that total power drawn from the solar cell will be equal to the total power demanded.

If a storage battery (50) is installed, the bi-directional charger (40) has to be connected between the high voltage DC bus (24) and the storage battery (50). The charger (40) is connected to the inverter (30), and also connected to the current signal output and control terminal of the MPPT circuit in the control unit (10), such that it can share the current output signal from the MPPT circuit with the inverter (30). The charger (40) can either charge the storage battery (50) or discharge from the storage battery (50) to the DC bus (24). When the current output signal from the MPPT circuit in the control unit (10) indicates that the battery (50) is in the charging mode, the current output signal will be proportionately distributed between the inverter (30) and the bi-directional charger (40).

As shown in FIG. 3, the bi-directional charger (40) includes two switches (41, 42), a choke (L1), and a charge current controller (43).

The two switches (41, 42) are respectively formed by one PWM controller (PWM1, PWM2) and one transistor (Q5, Q6). Each transistor (Q5, Q6) is connected in parallel by a parasitic diode or an external diode, wherein the first switch (41) is connected to the current output terminal and control terminal of MPPT circuit in the control unit (10).

The choke (L1) is connected to the DC bus (24) through the second switch (42). The charge current controller (43) includes a comparator (U1) and a voltage controlled resistor (VCR). Three inputs of the comparator (U1) are respectively connected to the control terminal of the control unit (10), a voltage reference signal (Vref) and the output of the storage battery (50). A voltage output of the comparator (U1) is connected to the VCR to adjust the resistance value. The VCR is further connected between the current signal output of the MPPT circuit and the second switch (42) to control the on-off timing of the second switch (42), thus forming a PWM based boost converter.

When the bi-directional charger (40) operates in the charging mode, the DC bus (24) charges the storage battery (50), that means the first switch (41) is disabled, the transistor Q6 acting as a diode only. The bi-directional charger (40) operates as a buck converter, wherein the comparator (U1) in the current control unit (43) will be able to adjust the resistance value of the voltage control resistor (VCR) by comparing the charge voltage of the storage battery (50) and the reference voltage (Vref). Since the input of the VCR is connected to the current output of the control unit (10), the output from the control unit (10) is converted from current to voltage, such that the on-off timing of the second PWM controller (PWM2) can be controlled through the second switch (42) to control the charging current to the storage battery (50).

When the bi-directional charger (40) operates in the discharging mode, the current from the storage battery (50) is converted and delivered onto the high voltage DC bus (24), that means the second transistor (42) is disabled, causing the transistor Q5 to act as a diode. Therefore, the bi-directional charger (40) composing of the first switch (41), the choke (L1) and the transistor Q5, collectively acting as a boost converter, such that the low voltage current from the storage battery (50) is converted to high DC bus voltage.

The operations of the inverter (30), charger (40) and boost converter (20) have been fully explained, and the function of the control unit (10) is to be explained below. Basically, the control unit (10) monitors the power output from the renewable power source (60), between the inverter (30) and the bi-directional charger (40) and the load and makes the necessary change in power distribution for the system in order to make the optimal usage of the solar energy.

Figure 6:
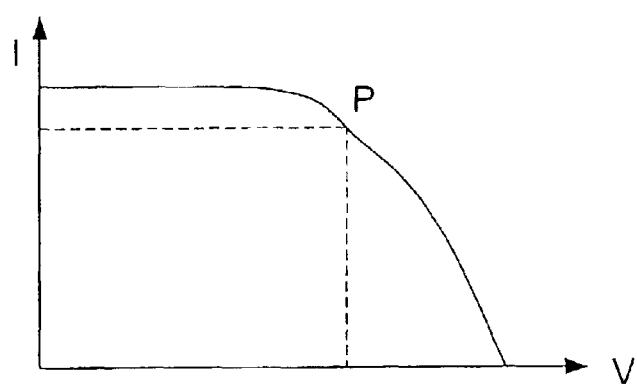
FIG. 6 is a characteristic curve of the output from the renewable power source, revealing the position with the optimum power efficiency.
Figure 5:
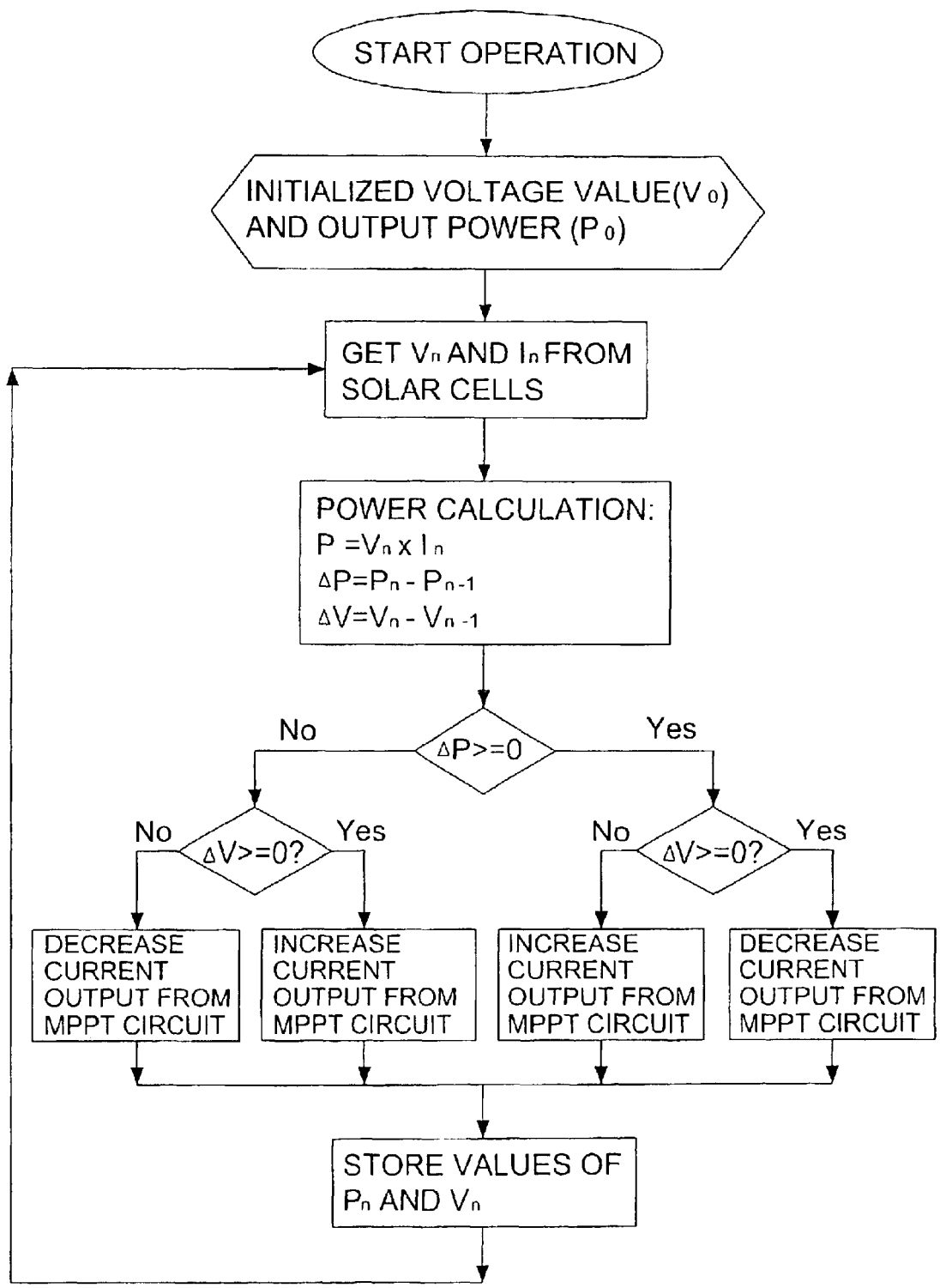
FIG. 5 a flow chart of the decision making process by the MPPT circuit in the control unit.
Figure 7:
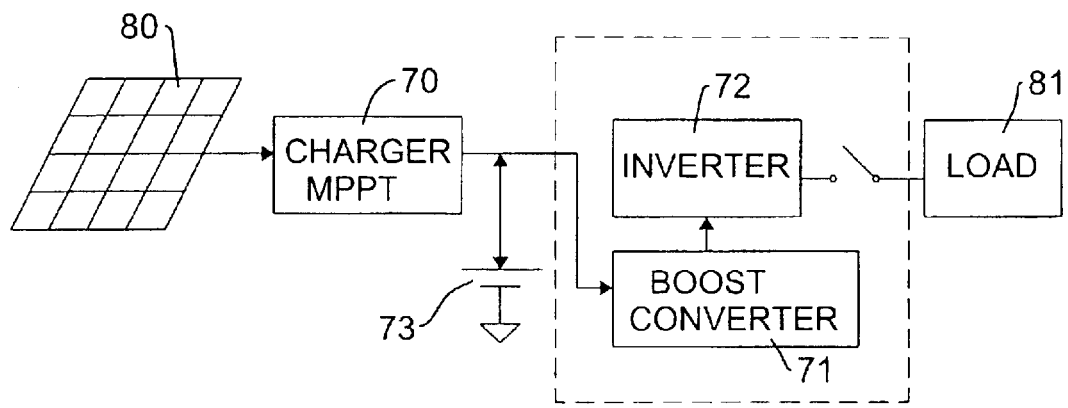
FIG. 7 is a block diagram of an inverter system in the prior art, having a storage battery and charger for standalone load.
Figure 8:
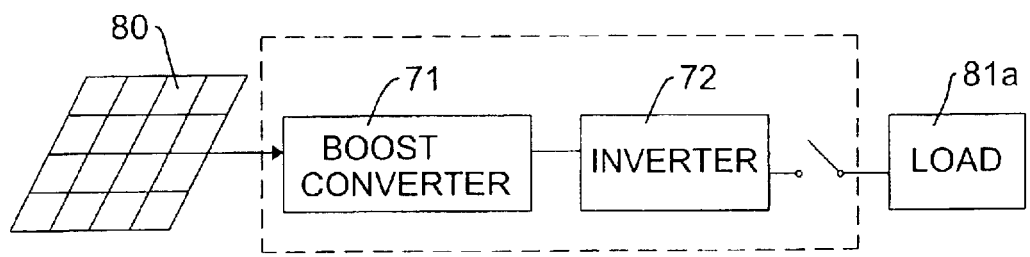
FIG. 8 is a block diagram of another inverter system in the prior art, having a high power conversion unit for grid-connected system.

For some renewable energy sources, especially for PV array, there is a maximum power point, as shown in FIG. 6, for accomplishing the optimal operation. An example is shown in FIG. 5. The MPPT circuit in the control unit (10) uses the initial voltage value ($V_0$) and the initial power output ($P_0$) to compare with subsequently obtained voltage and current values from the renewable power source (60) for calculating the power output ($P_n$) in the current cycle and the power output ($P_{n-1}$) in the previous cycle and producing the power output difference $\Delta P$ and the voltage difference $\Delta V$. Basing on the power calculation the MPPT circuit is able to make maximum use of the power from the PV array.

(1) If the difference in power output is greater than zero, the MPPT circuit then proceeds to determine whether the voltage difference is greater than zero. If yes, then the current output from the MPPT circuit will be decreased; and if no, then the current output will be increased.

(2) If the difference in power output is less than zero, then the MPPT circuit proceeds to determine whether the voltage difference is greater than zero. If yes, then the current output from the MPPT circuit will be increased; and if no, then the current output will be decreased.

After completing the decision making process in the current cycle, then the same process will be repeated again in the following cycles. In such manner, the MPPT circuit in the control unit can continuously monitor the power output from the renewable power source, and then control the total output from the bi-directional charger and the inverter to accomplish the optimum power efficiency for the system.

More specifically, the present invention can be operated in four operation modes:

Mode 1 (for standalone operation when installed with a storage battery):

When the power output from the renewable power source is greater than the power rating of the load, the charge control circuit of the bi-directional charger is enabled, such that any excessive power can be transferred from the inverter to the storage battery, thus the storage battery can be fully charged.

When the power output from the renewable power source is less than the power rating of the load, the discharge control circuit of the bi-directional charger is enabled, such that the power from the storage battery and the renewable power source are simultaneously fed to the inverter to supply the load.

Mode 2 (for standalone operation without the storage battery):

The power from the renewable power source is fed directly to the inverter, and the bi-directional charger can be removed without the storage battery.

Mode 3 (for grid-connected operation with the storage battery):

When the storage battery is fully charged, then the power from the renewable power source is completely delivered to the inverter, and the control unit only checks the power output status from the inverter.

When the storage battery is not yet fully charged, then the renewable power source is fed to the storage battery on priority, and the remaining power is transferred to the grid-connected system. The bi-directional charger automatically makes the power distribution proportionately between the storage battery and the grid-connected system under the control of the MPPT circuit.

When there is no power from the renewable power source, the control unit detects that the absence of current output from the renewable power source, it immediately orders the switch at the output of the inverter to cut off the current output from the inverter, that means the inverter is therefore disconnected from the grid, and at this time, if power output is needed by other load, then the inverter is switched to standalone operation mode.

Mode 4 (for grid-connected operation without the storage battery):

This operation mode is suited for non-charging operation, in which the current output from the inverter is monitored by the control unit, and the storage battery can be removed.

The following table summarizes all the operation modes of the system:

|  | Grid connection | MPPT circuit active | Charger operation direction | Optional charger present or not |
|---|---|---|---|---|
| Mode 1 | Yes | Yes | Charge or discharge depending on power for the load | Yes |
| Mode 2 | No | No | N/A | No |
| Mode 3 | Yes | Yes | Charge or discharge depending on power from the renewable power source | Yes |
| Mode 4 | No | Yes | N/A | No |

It can be understood now that the renewable power converter system under the present invention can be operated in various modes with control circuits including a control unit, a boost converter, an inverter and an optional bi-directional charger, and the power output can be constantly maintained in optimum conversion efficiency.

The foregoing description of the preferred embodiments of the present invention is intended to be illustrative only and, under no circumstances, should the scope of the present invention be so restricted.

What is claimed is:

1. A multi-mode renewable power converter system, comprising:
    a control unit having an input, an output and a control terminal for tracking and controlling the system;
    a boost converter for converting a low voltage DC power to high voltage DC, wherein the high voltage DC is output to a DC bus; and
    an inverter connected to the DC bus and the output of the boost converter, the inverter converting the high voltage DC power to AC applied to a standalone load or a grid-connected system;
    wherein the inverter is controlled by the control unit to be operated with the standalone load or the grid-connected system.

2. The multi-mode renewable power converter system as claimed in claim 1, wherein the control unit has a built-in MPPT circuit function to allow the DC output from the renewable power source to reach the maximum power point.

3. The multi-mode renewable power converter system as claimed in claim 1, wherein the boost converter is connected to a renewable power source to receive the low voltage DC power.

4. The multi-mode renewable power converter system as claimed in claim 2, wherein the boost converter is connected to a renewable power source to receive the low voltage DC power.

5. The multi-mode renewable power converter system as claimed in claim 3, wherein the renewable power source is a solar panel.

6. The multi-mode renewable power converter system as claimed in claim 4, wherein the renewable power source is a solar panel.

7. The multi-mode renewable power converter system as claimed in claim 1, wherein the boost converter includes a PWM controller, at least one switch and one choke connected to the DC bus for controlling the voltage level on the bus.

8. The multi-mode renewable power converter system as claimed in claim 7, wherein the switch is a MOSFET device with the gate electrode being connected to a control terminal of the PWM controller.

9. The multi-mode renewable power converter system as claimed in claim 2, wherein the inverter comprises:
    a full bridge conversion unit;
    a voltage feedback loop connected to the output of the full bridge conversion unit through a voltage output detector is for monitoring the voltage output from the full bridge conversion unit;
    a current feedback loop connected to the output of the full bridge conversion unit through a current detector is for monitoring the current output from the full bridge
    a mode control switch being connected in between the voltage feedback loop and the current feedback loop is directly controlled by the control unit; and
    a PWM controller is connected to the output of the voltage feedback loop and the current loop, and multiple output terminals of the PWM controller are respectively connected to the input of the full bridge conversion unit.

10. The multi-mode renewable power converter system as claimed in claim 9, wherein the full bridge conversion unit is formed by two pairs of alternating switches and a filter, wherein control terminals of the switches are respectively connected to the inputs of the full bridge conversion unit, and the input of the filter is connected to the output of the full bridge conversion unit.

11. The multi-mode renewable power converter system as claimed in claim 9, wherein the voltage feedback loop is formed by a subtractor and a reference sine wave generator, wherein the subtractor is connected to the output of the full bridge conversion unit and the reference sine wave generator.

12. The multi-mode renewable power converter system as claimed in claim 9, wherein the current feedback loop is formed by a multiplier, a subtractor and a reference sine wave generator,
    wherein input terminals of the multiplier is connected to the output of the MPPT circuit and the output of the reference sine wave generator, and the output of the multiplier is connected to the input of the subtractor, and after subtraction with the current output signal from the full bridge conversion unit a difference value is recorded by the PWM controller.

13. The multi-mode renewable power converter system as claimed in claim 9, wherein the bi-directional charger includes a charge control circuit and a discharge control circuit, wherein the operation of the charge and discharge control circuits are directly controlled by the control unit.

14. The multi-mode renewable power converter system as claimed in claim 10, wherein the bi-directional charger includes a charge mode controller and a discharge mode controller, wherein the operation of the mode controllers are directly controlled by the control unit.

15. The multi-mode renewable power converter system as claimed in claim 11, wherein the bi-directional charger includes a charge mode controller and a discharge mode controller, wherein the operation of the mode controllers are directly controlled by the control unit.

16. The multi-mode renewable power converter system as claimed in claim 13, wherein the bi-directional charger includes a first switch, a second switch, a choke, and a charge current control circuit, wherein the first and second switches are each formed by a PWM controller and a transistor, and each switch is connected by a parasitic or an external diode in parallel;

the choke is connected between the first and second switches, and also connected to the DC bus through the second switch; and the charge current control circuit includes a comparator and a voltage control resistor, where input terminals of the comparator are respectively connected to the control output and voltage reference signal of the control unit, and the output of the storage battery, whilst the voltage output terminal of the comparator is connected to the voltage control resistor for adjusting the resistance value, the voltage control resistor further connected to the current output of the MPPT circuit to control the voltage input to the second switch.

17. The multi-mode renewable power converter system as claimed in claim 16, wherein the transistors of the first switch and the second switch are MOSFET devices, and the gate electrode of the MOSFET device is connected to the control terminal of the PWM controller.

18. The multi-mode renewable power converter system as claimed in claim 1, wherein an bi-directional charger is connected to the DC bus and controlled by the control unit.

* * * * *